United States Patent Office 3,251,895
Patented May 17, 1966

3,251,895
ALLYL ALKYLATION CATALYST AND
ALKYLATION PROCESS
John B. Wilkes, Albany, Calif., assignor to Chevron
Research Company, a corporation of Delaware
No Drawing. Filed July 20, 1962, Ser. No. 211,430
12 Claims. (Cl. 260—668)

This invention relates to the preparation and use of alkali metal containing allyl alkylation catalysts. More particularly, it relates to the preparation of a dispersed allyl alkylation catalyst complex containing a superfinely divided solid inorganic nonacidic oxy-compound and a limited amount of a polar organic compound.

Alkali metal containing catalyst materials useful in the allyl alkylation of hydrocarbons, as for example in the dimerization of olefins, co-dimerization of dissimilar olefins, side-chain alkylation of aromatics, and the like, are necessarily extremely chemically reactive, are essentially insoluble in the inert hydrocarbon media desirably employed in their use, and because of these characteristics effective allyl alkylation catalysts capable of long life with high activity useful in continuous allyl alkylation processes are not known in the art.

It is known to prepare allyl alkylation catalysts using small amounts of organic dispersing aids to yield improved catalysts. These systems, however, are found in practice to be metastable. That is, small variations or fluctuations in the reaction conditions may cause a precipitous agglomeration of the disperse phase. Another unpredictable effect which is noted appears to be an autocatalytic tar and coke-forming reaction as between the dispersing agent, catalyst active reactants, and possibly the medium. When any of these conditions obtain, the reactor, process lines, and the like, must be thoroughly purged and a fresh start made. An expedient in the allyl alkylation catalyst art is to dispose the catalyst active upon a solid. This may offer some degree of improvement, depending upon the particular solid employed, over the dispersed system. Nevertheless, these catalysts have a tendency to agglomerate under allyl alkylation conditions which may be counteracted, but this requires efficient vigorous mechanical mixing at an appreciable energy and equipment cost. These disposed catalysts frequently are found to be of limited life as a result of undesirable side reactions and to suffer from unpredictable variations in activity from batch to batch in the catalyst preparation.

It has now been discovered that alkali metal containing allyl alkylation catalysts suitable for use in continuous alkylation processes may be produced in an aprotic hydrocarbon medium by contacting under dispersing conditions and a temperature below about 230° C. in the following proportions:

(1) One gram atom of molten alkali metal having an atomic number greater than 3 and less than 56;

(2) From about 7 to 45 cc. of an inorganic, nonacidic, solid oxy-compound substantially unreactive to alkali metals and aprotic hydrocarbons at temperatures below 230° C. having a particle sizing in the range from about 0.1 to 10 microns;

(3) From about $7 \times 10^{-4}$ to $1.0 \times 10^{-1}$ mols of an organic compound thermally stable up to at least 230° C. having a dipole moment of at least 1 Debye unit ($\mu \times 10^{18}$ e.s.u.) and having at least one oleophylic group; and (4) From about 0.3 to 7.5 liters of aprotic hydrocarbon.

Allyl alkylation catalyst complexes prepared by contacting the above designated components in the kinds, proportions and physical states indicated under dispersing conditions are found to be generally of excellent activity and highly reproducible. Induction periods experienced in their use are negligible or of short duration, and the coke and tar formation problems of the prior art catalysts as well as catalyst meta-stability are eliminated. Especially advantageous in the use of the catalysts of the present invention is the removal of any particular requirement for mechanical mixing. A monomer-gas jet stream or an inert gas stream is generally adequate.

In general, the preparation of satisfactory allyl alkylation catalysts involves the contacting of a mixture of molten alkali metal, discreetly sized solid particles, a polar organic compound, and an aprotic hydrocarbon medium under dispersing conditions. By dispersing conditions is meant high speed, high sheer stirring as by mechanically driven mixing blades, high frequency vibrators, and the like, such as are known in the dispersion producing and emulsion producing art and the equivalent. The contacting is accomplished at temperatures from about 30° C. to 230° C. During the preparation of the catalyst complex, temperatures just exceeding the point of the alkali metal up to 20–40° above the melting point are preferred, because until the actual complex is established, the mutual stabilizing effects of the associated components are not available. Thus, while higher temperatures may be employed, there is little or no advantage in so doing. As indicated, the particle size of the solid and the relative amounts of the components used in preparing the catalyst determine whether or not a satisfactory allyl alkylation catalyst results. Thus, the inorganic solid oxy-compound must be of a superfine particle size, that is, in general below about 10 microns and above about 0.10 micron. Particle sizing in the range 0.1 to 6 microns yields excellent catalysts. Solid particles of sizes somewhat greater than about 10 microns, as shown by microscopic examination, do not appear to form the catalyst complex. On the other hand, particles sized below about 0.1 micron are unsatisfactory.

The inorganic oxy-compounds contemplated for use in the present process are in general nonacidic and substantially unreactive in superfinely divided form with alkali metals at temperatures up to 200° C. and even 230° C. and higher. They are also necessarily substantially unreactive toward hydrocarbons up to 230° C. and higher, and desirably have a density less then 5.0 grams/cc. In a preferred form, these oxy-compounds are crystalline as contrasted with amorphous matter, and have a density less than 3.0 grams per cubic centimeter. More preferably, the oxy-compounds are crystalline oxy-salts; still more preferably, they are oxy-salts wherein the negative radical comprises elements having atomic numbers less than 17; and of the oxy-salts wherein the negative radical comprises elements having atomic numbers less than 17, those compounds in which the positive radical is the cation of an element having a related electronegativity below about 1.6 (c.f. "Nature of the Chemical Bond," Linus Pauling, Cornell Univ. Press, 1945, p. 65) are most particularly preferred compounds. By oxy-compounds is meant both individual compounds and compound mixtures.

As an illustration of compounds embraced within the scope of the inorganic oxy-compounds referred to herein are the substantially anhydrous compounds of aluminum orthophosphate, aluminum silicate, aluminum sulfate, barium carbonate, barium oxide, barium hypophosphate, barium orthophosphates, barium metasilicate, barium sulfate, barium thiosulfate, beryllium aluminate, beryllium aluminum silicate, beryllium oxide, beryllium carbonate, beryllium orthophosphate, beryllium orthosilicate, beryllium sulfate, calcium aluminate, calcium carbonate, calcium oxide, calcium metaphosphate, calcium silicates, calcium sulfate, cerium carbonate, cesium carbonate, cesium sulfate, lanthanum carbonate, lanthanum sulfate, lithium metaaluminate, lithium carbonate, lithium oxide, lithium orthophosphate, lithium orthosilicate, lithium metasilicate, lithium sulfate, magnesium carbonate, magnesium oxide, magnesium sulfate, potassium carbonate, potassium metasilicate, potassium disilicate, potassium oxide, potassium hydrogen silicates, potassium sodium silicate, potassium sulfate, rubidium sulfate, rubidium carbonate, scandium sulfate, sodium metaaluminate, sodium calcium sulfate, sodium carbonate, sodium oxide, sodium phosphate, sodium orthosilicate, sodium disilicate, sodium metasilicate, sodium sulfate, strontium carbonate, strontium metasilicate, yttrium sulfate.

Also included are the natural minerals and, particularly, the siliceous minerals such as micas, talcs, feldspars, feldspathoids, pyroxenes, amphiboles, olivines, borosilicates, complex calcium silicates, zeolites, and the like. Rare earth minerals are also contemplated such as monazite, bastnasite, and the like.

Specific illustrations of minerals contemplated include anorthite, celite, dolomite, merwinite, diopside, bellite, pseudowallastonite, wallastonite, spinel, clinoenstatite, microcline, muscovite, krugite, polyhalite, kalusite, kainite, langbeinite, albite, bloedite, celestite.

Further examples of minerals are orthoclase, microcline, anorthoclase, plagioclase, leucite, nepheline, sodulite, lazulite, enstatite, hypersthrene, augite, jadeite, anthrophyllite, trimolite, hornblende, vesuvianite, epidote, prehnite, scapolite, biotite, phlogopite, lepidolite, heulandite, stilbite, chabazite, analcite, natrolite, clinochlore, pennimite, serpentine, spodumene, willimite, andulusite, cyanite, silimanite, titanite, dalolite, olivine, forsterite, and the like.

Additionally, other solid inorganic oxy-compounds include aluminum oxide, barium selinate, barium sulfite, barium tungstate, beryllium orthoborate, beryllium selenate, cadmium metasilicate, cadmium orthophosphate, cadmium sulfate, calcium aluminoferrites, calcium metaborate, calcium sulfite, ceric sulfate, dysprosium carbonate, lithium metaborate, lithium sulfite, magnesium orthoborate, magnesium phosphate, magnesium thiosulfate, manganese metasilicate, neodynium sulfate, potassium aluminum borate, potassium metaborate, potassium orthophosphate, potassium metaphosphate, potassium hydrogen phosphite, potassium selenate, potassium pyrosulfate, potassium sulfite, potassium thiosulfate, praseodymium sulfate, rubidium aluminum sulfate, sodium metaborate, sodium molybdate, sodium selenate, sodium sulfite, sodium pyrosulfite, sodium thiosulfate, sodium tungstate, sodium orthovanadate, sodium pyrovanadate, strontium sulfite, zinc aluminate, zinc metasilicate, zinc sulfate.

Functionally, the satisfactory solid inorganic compounds must contain (1) bound oxygen, (2) be substantially unreactive towards alkali metals, (3) be of a particle size in the range from about 0.1 to 10 microns, and (4) be free of relatively loosely bound or adsorbed water.

The organic compounds which may be used in the preparation of the catalyst complex may vary widely so long as they have an appreciable dipole moment and are substantially thermally stable up to about 230° C. Accordingly, they must contain at least one polar constituent, and must contain at least one unreactive oleophylic group. The dipole moments of the organic compounds preferably will be at least 1 Debye unit ($\mu 10^{18}$ e.s.u.), more preferably, above 1.5 units and even as high as 5 units. The unreactive olephylic constitutent of the organic compound must be an inert hydrocarbon radical which may be a single methyl group but more desirably is one or more unreactive hydrocarbon radicals containing four or more methylene —$CH_2$— units, as in alkyl cycloalkyl, alkenyl, cycloalkenyl, and alkyl subtituted cycle alkyl and phenyl radicals having up to 20 carbon atoms per group and more. No particular advantage accrues from the use of the higher molecular weight organic compounds, and particularly those compounds which are relatively insoluble in paraffinic white oil petroleum fractions. Particularly preferred organic compounds useful in the process of the present invention have a dipole moment of at least 1 Debye unit, have a single polar constituent group, and less than three unreactive oleophylic hydrocarbon groups, each having from about 1-20 carbon atoms. Still more preferably, the organic compounds have a single acidic polar constitutent group having a pKa in the range for about 1-28 (measured in hydrocarbon medium or stated qualitatively, a pKa in the range defined by that of benzene sulfonic acid as one extreme and slightly less than that of the α-hydrogens of toluene in the other, as measured in a hydrocarbon medium) and a single unreactive oleophylic group having from about 1 to 20 carbon atoms. Of the acidic polar constituents having a pKa below 28, the oxygen and nitrogen containing groups are the most preferred.

Among the polar groups contemplated are:

I. Strongly acidic (pKa range~1–8) —$SO_3H$, —$CO_2H$, —$PO_2H$, —$SO_2H$, $PO_3H_2$, II. Intermediately acidic (pKa range~9–20) —OH, —SH, —$CH_2NO_2$, —$CH_2C\equiv N$,
—$CH_2CHO$, =($CH_2CO$), III. Weakly acidic (pKa~21–28) —$NH_2$, —$CONH_2$, —$SO_2NH_2$, —$PO_2NH_2$ where pKa values are approximated and are taken to be representative of values obtained in an aprotic hydrocarbon medium.

Representative organic compounds of (I) are formic acid, acetic acid, propionic acid, isobutyric acid, 2,2-dimethylbutanoic acid, pivalic acid, hexanoic acids, decanoic acids, lauric acid, oleic acid, stearic acid, abietic acid, benzoic acid, tertiary butylbenzoic acid, cyclohexanecarboxylic acid, cyclohexenecarboxylic acid, linoleic acid, pentenoic acids, hexenoic acids, decenoic acids; that is, aliphatic acids of the general formula R—$CO_2H$, where R may vary in the range indicated by the general formula —($C_aH_b$) where $a$ may be 1–19 and $b$ may be from 3–39.

In like manner compounds may be listed representative of phosphonates, sulfonates and the like for example, n-hexadecyl phosphonate or sulfonate, but no particular purpose is served by a repetitious listing. Effective compounds are aptly described in the functional sense in the terms pKa range (~1–18), dipole moment range (~1.5–5.0 Debyes), and unreactive hydrocarbon radicals as defined by the general formula above for "R."

Representative compounds containing group II polar substituents have in general pKa values in the range from about 9–20, and dipole moments in the range 1.5–5 Debye units, and are compounds such as ethanol, cyclohexanol, lauryl alcohol, octadecyl alcohol, hexadecenyl alcohol, phenol, nitropropane, nitromethane, nitrobenzene, nitrocyclohexane, valeronitrile, pentadecylnitrile, eicosanylnitrile, nitrohexadecane, butyraldehyde, acetaldehyde, isovaleraldehyde, crotonaldehyde, enanthaldehyde, octaldehyde, hexadecaldehyde, phenylacetaldehyde, acetophenone, methylethylketone, dibutylketone, and the like, including the analogously substituted stable hydrocarbon radicals as represented by the general formula for "R" to be noted above.

Representative compounds containing group III polar substituents have in general pKa values in the range from about 21–28 and dipole moments in the range from about 1.1 to 4.5, and are compounds such as butyl amine, methyl amine, cyclohexyl amine, hexadecyl amine, aniline, benzamide, caproamide, valeroamide alkyl ureas, benzene-sulfonamide, alkyl phosphonamides, alkenyl sulfonamides, hexadecyl sulfonamide, octanyl phosphonamide, cyclohexyl sulfonamide, stearoylamide, cyclohexanecarboxylic acid amide, formamide, acetamide, eicosylamine, including the analogously substituted stable hydrocarbon radicals as represented by the general formula for "R" to be noted above.

Polyfunctionally substituted hydrocarbon radicals containing two and even three or more of the polar groups or combinations thereof are also useful in the preparation of the catalysts, and in general the relative amounts to be used per gram atom of the alkali metal are the same as for the compounds containing a single polar group and a single hydrocarbon radical. No particular advantage appears to result from their use and, of course, the more complex the compound, in general, the more costly it is.

Functionally, the polar nature of the group is believed to serve in part as a bond generating force which contributes to the stability of the catalyst complex through electrostatic interactions with the solid oxy-compound. Chemical interactions also are believed to contribute, and thus in the constitution of the complex a portion of the alkali metal may react with the polar organic compound to yield a salt.

While the above materials are the preferred form of the polar organic material because they appear to yield the more suitable allyl alkylation catalyst systems, the derivative forms are also useful. Thus, salts of the acidic organic polar materials are useful but suffer in utility, generally, because of the relative difficulty in obtaining the desired distribution of these materials into the catalyst complex. Other and somewhat more useful derivative forms than the salts are the ester and ester-like forms, such as ethers, anhydrides, peroxides, acetals, ketals and the like, which are oil-soluble and may interact with a portion of the catalyst precursor and active material, and be converted into forms analogous to those obtained when the acidic materials per se are used.

Of the alkali metals, sodium, potassium, rubidium, and cesium and their mixtures yield allyl alkylation catalyst complexes by the present process, that is, alkali metals having an atomic number below 56 and above 3. Lithium alone appears to be ineffective, and in mixtures with other alkali metals seems to contribute little, if any, activity insofar as allyl alkylations are concerned. Potassium, rubidium, and cesium are very much preferred, and potassium is definitely superior. It should be recognized that the active component of the catalyst complex may be furnished by the alkali metal hydride or a corresponding organo metallo derivative, provided particle sizes are about 1–10 microns.

The continuous hydrocarbon phase required for the preparation and use of the allyl alkylation catalyst complexes may be supplied by a normally aprotic, inert hydrocarbon, usually a refined paraffinic hydrocarbon free of traces of partial oxidation impurities, reactive alkyl aromatic hydrocarbons and conjugated diolefins. Satisfactory hydrocarbon media have an absorbence at 275 m$\mu$ of less than 0.3 when measured in a one-centimeter cell. In general, and to facilitate the continuous process use of the allyl alkylation catalysts, the hydrocarbon medium is usually selected such that its boiling point exceeds that of the allyl alkylation product. This makes possible the highly desirable vapor phase product removal from the reaction zone.

By unreactive inorganic solid oxy-compounds is meant inertness of these compounds such that, at most, only a relatively small portion, if any, of the total amount for example of an aliquot of alkali metal per se, is dissipated upon being contacted with the super-finely divided solid in the presence of an inert hydrocarbon medium and a nitrogen or other inert gas atmosphere. Because of the extreme reactivity of the allyl alkylation catalysts toward a great variety of agents, and also because of the actual paucity of physico-chemical knowledge regarding reactivities as between superfinely divided solid compounds and the active catalyst per se, an empirical stability test is useful to define the meaning of "unreactive" as used in the present invention. Thus, by the test, an unreactive compound is one which after contact with an alkali metal, for example, potassium, for a period of 2 hours at 150° C. yields upon reaction with 2-methoxyethanol at least 65% of the hydrogen to be expected, based upon the amount of the metal used. For a meaningful test, the particle sizes are necessarily of the order of 0.1 to 10 microns. A superfine compound which passes this test is found to be sufficiently unreactive towards the allyl alkylation catalyst active to yield satisfactory catalyst complexes.

In general, oxy-compounds whose cationic components are elements having relative electronegativity values below 1.6 are unreactive. Especially included cations are lithium, sodium, potassium, rubidium, cesium, beryllium, magnesium, calcium, strontium, barium, and aluminum, either alone or in admixture in oxy-compounds having as the anionic component orthosilicate, metasilicate, carbonate, sulfate, oxide and the like, which are substantially freed of loosely bound water. The test is most useful for oxy-compounds not having the cationic components noted above. The form, origin, and prior treatment of these materials may or may not render them satisfactory for use in preparing the allyl alkyl alkylation catalyst complex. Finely divided crystalline quartz appears to be a satisfactory oxy-compound, while, on the other hand, synthetic finely divided silicon dioxides have been found by the test to be extremely reactive and very undesirable. Similarly unpredictable are aluminum oxides variously derived. The above test affords a positive and reliable means of screening new solid oxy-compounds for use in allyl alkylation catalyst preparations of the present process.

The amount of superfine solid relative to the molten alkali metal or alkali metal mixture which may be used varies over a range. Broadly, in terms of net solid volume, from about 7 to 45 cc. of superfinely divided solid per gram atom of the alkali metal is required. From about 10 to 36 cc. of solid is a desirable range, and still more so is that of about 12 to 20 cc. Depending upon the density of the particular oxy-compound, the weight to be used will vary, of course. Appreciably smaller relative amounts of solid result in the production of metastable complexes or no complex at all. Relative amounts of solid greater than about 45 cc. do not appear to result in an appreciable enhancement of the stability of the allyl alkylation complex, and is even undesirable because the presence of unneeded inert solid in the reactor necessarily means a corresponding reduction in reactor efficiency per unit volume.

The amount of the polar organic compound which may be used per gram atom of alkali metal in preparing the allyl alkylation catalyst complex varies depending in large part upon the molecular weight thereof. Qualitatively, as much as $1.0 \times 10^{-1}$ mols and as little as $7 \times 10^{-4}$ mols of the organic compound may be used. When the molecular weight is high, for example, in the range comparable to a $C_{10}$ carboxylic acid $$[C_9H_{19}(COOH)]$$

and higher, smaller amounts of compound are desirably used. Thus, in general, amounts greater than about $1.4 \times 10^{-2}$ mols per gram atom of compounds having molecular weights greater than a $C_{10}$ carboxylic acid and higher are unsatisfactory, a problem associated therewith being a pronounced viscosity increase. For these materials from about $2.5 \times 10^{-3}$ up to $1.0 \times 10^{-2}$ mols per gram atom of alkali metal are particularly desirable. On the other hand, for the lower molecular weight polar organic compounds, for example, those compounds having molecular weights below about a $C_9$ carboxylic acid 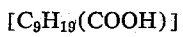 [$C_8H_{17}(COOH)$] and lower, the preferred range is from about $2.5 \times 10^{-3}$ up to about $1 \times 10^{-1}$ mols of polar organic compound per gram atom of alkali metal used. Broadly, therefore, from about $7 \times 10^{-4}$ up to $1.0 \times 10^{-1}$ mols of polar organic compound per gram atom of alkali metal, and from about 7 to 45 cc. of superfinely divided oxy-compound are required to prepare a stable allyl alkylation catalyst. While the above discussion is in terms of carboxylic acids, essentially the same relative values are to be used where other polar groups supply the necessary polar character to the molecule.

In order to illustrate the advantages obtained in the production and use of the allyl alkylation catalysts of the present invention, the following examples are presented. They are intended only as illustrations and are not to be construed as further limitations upon the scope of the invention.

EXAMPLE 1

A series of runs was made wherein no polar organic compound was used in the preparation of the allyl alkylation catalyst. The examination of portions of these catalysts indicated the alkali metal was disposed uniformly upon the finely divided solid and that numerous relatively larger clusters of associated particles were present. Large variations in relative reactivities were found, although test conditions as well as catalyst preparations were standardized. Thus, in the dimerization of propene in a continuous reactor at 150° C., 900 p.s.i.g. using catalysts obtained by disposing in the proportions, 1 gram atom of potassium upon an equal weight (13.5 cc.) of a mixed Mg, Ca, Al silicate having particle sizes in the 1–10 micron range in the presence of 1.3 liters of refined paraffinic hydrocarbon the following representative relative reactivities were noted (unit activity is assigned to comparative Run 7 wherein $2.7 \times 10^{-3}$ mols of a polar organic compound per mol of alkali metal is added).

alkylation catalyst. On the other hand, catalysts prepared using oxy-compounds and the proper amount of a polar organic compound consistently show activities varying by less than about 5%.

EXAMPLE 2

Various polar organic compounds were tested for use in allyl alkylation catalyst preparation by contacting about 90 parts of refined paraffinic hydrocarbon, 4 parts of potassium, and 0.16 part of the organic compound under an inert atmosphere at 110–120° C. under vigorous dispersing conditions. A portion of the resulting dispersion was then introduced into a rocking autoclave, also containing an inert atmosphere, and propene was introduced to a final pressure of about 1200 p.s.i.g.. The autoclave was maintained at 150° C. until the reaction commenced and until the pressure had dropped to about 600 p.s.i.g., at which time the reaction was stopped by cooling and venting the autoclave. The autoclave and run were examined for gross potassium and particles of tar and coke, and samples of the allyl alkylation catalysts thus prepared were examined under a microscope. Table II contains a representative listing of compounds tested. Further testing of the more promising materials in a continuous reactor under allyl alkylation conditions indicated these allyl alkylation catalyst systems were metastable; thus, otherwise relatively minor temperature variations were found among other undesirable effects to unpredictably cause rapid agglomeration of the catalyst under the continuous allyl alkylation conditions. From these data it is to be noted that the conventional dispersing aids useful in the preparation of alkali metal dispersions are unsatisfactory for the preparation and use of allyl alkylation catalysts under continuous allyl alkylation process conditions.

*Table II.—Allyl alkylation catalysts containing no superfinely divided solid*

| Polar Organic Compound | Amount (wt. percent of K) | Catalytic Activity | Condition of Activated Catalyst System | Evaluation (For Continuous Process Use) |
|---|---|---|---|---|
| Oleic Acid | 4 | + | Good | Agglomerated in use. |
| Do | 2 | + | Mostly agglomerated | Unsatisfactory. |
| Do | 10 | + | Carbonaceous solids formed | Do. |
| Lauric Acid | 4 | + | Gross potassium particles and coke | Do. |
| Do | 8 | + | Gross potassium particles and tar | Do. |
| Stearic Acid | 8 | + | Traces of coke | Do. |
| Docosanoic Acid | 4 | + | Coke present | Do. |
| Oleic and Docosanoic | 2+2 | + | Much coke | Do. |
| $C_{12}$ Alkyl-Aryl Sulfonic Acid | 2 | + | Free potassium and coke | Do. |
| Do | 4 | + | Carbonaceous solids | Do. |
| $C_{12}$ Alkyl-Aryl Sulfonic Acid and Oleic Acid | 3 | + | Coke | Do. |
| Hexadecylamine | 4 | + | Free potassium, coke | Do. |
| Pyridine | 4 | + | ...do | Do. |
| Cumene Hydroperoxide | 4 | + | ...do | Do. |

*Table 1*

| Run No | 1 | 2 | 3 | 4 | 5 | 6 | 7 |
|---|---|---|---|---|---|---|---|
| Time, hrs | 12 | 46 | 87 | 17 | 24 | 24 | 61 |
| Relative activity | .14 | .28 | .77 | .11 | .49 | .16 | 1.0 |

These data show that although precautions are taken to standardize catalyst preparation and use, there is a seven-fold variation in activity of the catalyst where no organic polar compound is added in preparing the allyl

EXAMPLE 3

Example 2 was repeated except that for each gram atom of alkali metal, about 14 cc. (net volume) of an oxy-compound, comminuted to a superfinely particle sizing in the range 1–10 microns and thoroughly dispersed by ball-milling, was added. The mixed silicate solid which was a crystalline metamorphic talc was used as a standard because it is a highly uniform commercially available material. The results of the tests of alkali metal containing catalysts using a variety of polar organic compounds and unreactive solid oxy-compounds are listed in Table III following:

clave runs and in a continuous reaction unit for the dimerization of propene.

*Table III.—Polar organic compounds and allyl alkylation catalysts containing superfinely divided solid*

| Organic Compound | Amount, Moles/Gram Atom K ×10² | Dipole Moment (e.s.u.) | Solid oxy-Compound | Catalytic Activity | Condition of Used Catalyst System (Particle Size, Range, Microns) | Evaluation for Continuous Process Use |
|---|---|---|---|---|---|---|
| Oleic Acid | 5.5 | | Ca, Mg, Al Silicate | + | Excellent (3–35) | Excellent. |
| Stearic Acid | 5.5 | | do | + | Good (3–20) | Good. |
| Lauric Acid | 7.8 | | do | + | Excellent (3–16) | Excellent. |
| Abietic Acid | 5.2 | | do | + | Excellent (5–30) | Do. |
| $C_{12}$ Alkyl Aryl Sulfonic Acid | 4.2 | | do | + | Excellent (1–15) | Do. |
| 1-Dodecanol | 8.4 | 1.7 | do | + | Excellent (1–15) | Do. |
| Phenol | 17 | 1.5 | do | + | Good (5–450) | Good. |
| 2-Butoxyethanol | 13 | | do | + | Good (10–30) | Do. |
| Cumene Hydroperoxide | 10 | | do | + | Excellent (6–18) | Excellent. |
| Hexadecylamine | 6.5 | | do | + | Excellent (3–15) | Do. |
| Pyridine | 20 | | do | + | Excellent (4–25) | Do. |
| N-Lauroyl, N-Methylglycine | 6.0 | | do | + | Good (6–40) | Good. |
| n-Hexanoic Acid | 13 | | do | ++ | Excellent (1–15) | Excellent. |
| Acetic Acid | 6.5 | 1.7 | do | + | Excellent (3–12) | Do. |
| 1-Hexanethiol | 13 | 1.5 | do | + | Excellent (3–15) | Do. |
| Butyric Acid | 6.7 | 1.7 | do | + | Good (3–20) | Satisfactory. |
| Stearamide | 5.5 | 4 | do | + | Excellent (1–6) | Excellent. |
| Tridecanenitrile | 8.0 | 4 | do | + | Good (1–20) | Satisfactory. |
| Oleic Acid | 2.7 | | Sodium Metasilicate | + | Excellent (1–15) | Superior. |
| Do | 2.7 | | Barium Sulfate | + | Excellent (1–15) | Excellent. |
| Do | 2.7 | | Calcium Silicate | + | Good (3–30) | Good. |
| Do | 2.7 | | Magnesium Silicate | + | Good (2–90) | Do. |
| Do | 2.7 | | Aluminum Silicate | + | Excellent (3–30) | Do. |
| Do | 2.7 | | Magnesium Oxide | + | Good (50–150) | Do. |
| Do | 2.7 | | Calcium Carbonate | + | Good (3–50) | Do. |
| Do | 2.7 | | Calcium Phosphate | + | Free K, coke [1] | Unsatisfactory. |

[1] Particle size of $Ca_3(PO_4)_2$ too small.

The above data considered in connection with that of Table II show that polar organic compounds are generally unsatisfactory for the production of stable alkali metal containing allyl alkylation catalysts in the absence of critical amounts of sized unreactive solid oxy-compounds. This fact is even apparent for many polar compounds in a simple batch test, for the others relatively short testing under continuous allyl alkylation conditions soon establishes a deficiency. Functionally, the organic compounds may be said to require a polar component capable of generating a dipole moment of at least one Debye unit and preferably one having a pKa below about 28, and a hydrocarbon component, dielectric in nature, which is stable under allyl alkylation conditions. From the examples, it is to be seen that the hydrocarbon component may be supplied by a group as small as a methyl group and as large as an 18 carbon atom alkyl or alkenyl group and larger. Hydrocarbon components containing from 1 to 20 carbon atoms per group are clearly useful. The groups may be normal alkyl, branched alkyl, cyclic, acyclic, and phenyl.

Where an easy safe disposition of spent catalyst is of particular importance, catalysts prepared from alkali metal, meta- and orthosilicates, i.e., water soluble oxy-compounds and stable polar organic compounds whose hydrocarbon component contains from 1–10 carbon atoms per group, are preferred. A further advantage of these catalysts using the alkali metal solid oxy-compounds are their nonacidic nature, which appears to make them useful where 1-alkene product maximization is desired.

EXAMPLE 4

Within a range a definite amount of a polar organic compound is required to produce stable allyl alkylation catalysts. The results listed in Table IV following were obtained by preparing the catalysts in the preferred manner except that the amount of the organic compound, oleic acid, was varied as indicated. For each gram atom of potassium, 13.4 cc. of a mixed silicate, a metamorphic talc, was used. The catalysts were tested in batch auto-

*Table IV.—Alkali metal-polar organic compound ratio and the catalyst*

| Mols of Organic Compound/ Gram Atom K×10³ | Catalyst Inspection |
|---|---|
| 0 | K disposed on solid; tends to agglomerate in continuous use. |
| 0.7 | Unsatisfactory for continuous use. |
| 1.4 | Usually reproducible, occasional unsatisfactory catalyst. |
| 2.8 | Consistently reproducible catalyst averaging about 800 gr. of timer/gram of K/half life. |
| 5.6 | Excellently reproducible catalysts known to yield 2000+ gr. dimer/gram K/half life. |
| 14 | Unsatisfactory catalyst, gelatinous medium. |

These data and the data of Table III indicate that from about $1.0 \times 10^{-3}$ to $1.0 \times 10^{-2}$ mols of a polar material of the molecular weight in the range of oleic acid, used in conjunction with an unreactive oxy-compound having a particle size in the range 1–10 microns, is required in the formulation of a stable allyl alkylation catalyst. In the use of polar organic compounds having smaller molecular weights, for example, of the order of acetic acid up to a $C_{10}$ carboxylic acid, whether of branched or normal carbon chain configuration, the operable amounts of polar organic compound relative to the alkali metal is somewhat larger, being from about $1.0 \times 10^{-3}$ up to about $1.0 \times 10^{-1}$ mols of the material per gram atom of the alkali metal. These lower molecular weight materials are distinctly advantageous over the higher molecular weight materials for several reasons, among which are the absence of any tendency to produce foam and more favorable medium viscosities.

EXAMPLE 5

*Particle size.*—Allyl alkylation catalyst complexes prepared from oxy-compounds having an appreciable fraction of particles in sizes ranging above about 20 microns are in general unsatisfactory for use in a continuous process. Two catalysts were prepared under comparable conditions except that the oxy-compound, a silicate in one instance, contained possibly as much as 5% of 20+ micron particles, and in the other the same material was subjected to comminution such that the particles were essentially all in the range 1–10 microns. In the preparation of the catalyst the components were present in the proportions of 1 gram atom of potassium, 13.4 cc. of the silicate, and $5.4 \times 10^{-3}$ mols of oleic acid. Each catalyst was tested as in Example 2 and then inspected. The catalyst prepared from the 1–10 micron sized silicate was especially suited for use in a continuous reactor; the other had agglomerated to a hard unreactive solid. These and similar data indicate that for the preparation of stable superfinely divided alkali metal containing allyl alkylation catalysts, not only must an unreactive solid compound be used, but it must be of a particle size comparable to that of the active component.

EXAMPLE 6

In the preferred manner, a series of catalysts was prepared and tested, as in Example 2, using 10 parts solid (alkali metal plus oxy-compound, Ca, Mg, Al silicate), 90 parts of refined paraffin white oil, and oleic acid in the proportions listed in Table V following.

Table V

| CC. of Solid/ Gram Atom Potassium (1–10 microns) | Mols Polar Organic Compound/ Gram Atom K×10 | $gC_3H_6/gK$ Dimerized/ Hour | Catalyst Inspection |
| --- | --- | --- | --- |
| 6.7 | 2.8 | 0.0 | Agglomerated. |
| 13.4 | 2.8 | 5.4 | Stable Complex. |
| 26.8 | 5.6 | 5.7 | Do. |
| 40.6 | 2.8 |  | Much Uncomplexed Oxy-Compound. Catalyst Active and Stable. |

These data indicate that while at least about 8–10 cc. of a mixed crystalline metamorphic silicate is required to yield a stable catalyst, as much as 41 cc. of the superfinely divided solid is an excess. No particular disadvantage was noted by reason of the excess in this test. In a continuous unit, however, unneeded oxy-compound detracts from the reactor unit volume production efficiency. When other unreactive superfinely divided oxy-compounds are used, similar results obtained, although minor variations in relative amounts may be desirable. On the other hand, when the oxy-compound used has a particle size less than about 0.1 micron, i.e., a material having a size 1/10 and less of the alkali metal particles normally attainable, no stable complex results. Thus, when for each gram atom of alkali metal about 13.4 cc. of calcium phosphate having an estimated particle size of 0.03 micron was substituted, the potassium agglomerated and no allyl alkylation catalyst complex was obtained.

EXAMPLE 7

*Catalyst preparation (A).*—In a typical catalyst preparation, an oxy-compound, for example, sodium metasilicate, having a particle sizing in the range 1–10 microns and practically freed of adsorbed extraneous matter, is dispersed in an aprotic hydrocarbon medium, such as an alkane, cycloalkane, and a paraffinic petroleum fraction practically freed of aromatic hydrocarbon and partially oxidized hydrocarbon impurities. Even where 1–10 microns presized solid particles are used, it is frequently desirable to subject the solid admixed with the paraffinic hydrocarbon (weight ratio hydrocarbon to solid about 85–15) to a period of ball-milling or the equivalent. Where presized particles of the desired solid oxy-compound are not available, the powdered solid may be subjected as above to milling in the presence of the paraffinic hydrocarbon in a ball, paint, or colloid mill until inspection under high powered microscope indicates the particles are properly sized.

The weight ratio of dispersed solid in paraffin is adjusted in accordance with the catalyst concentration desired by adding additional hydrocarbon after transfer of the solid-oil dispersion to a suitable vessel fitted with an efficient dispersing means such as an ultra high speed (10,000–15,000 r.p.m.) high shear blade fitted stirring mechanical element, an ultrasonic vibrator or the equivalent.

The dispersion is then heated to a temperature above the melting point of the alkali metal to be used and preferably to 100–120° C. and the alkali metal and the polar organic compound are introduced into the slurry and contacted, while high speed stirring or the like is continued. For the preparation of the more concentrated catalysts incremental addition is usually made. The dispersing action is continued at temperature for a period sufficient to facilitate even distribution of the catalyst components and some conditioning of the associated complex. A period of about 0.5 to 1 hour usually is adequate; however, a positive determination is possible by inspection of a sample under the microscope. Particle sizes should be less than about 15 microns.

Allyl alkylation catalysts prepared in this manner are highly reproducible, are stable to temperature fluctuations under allyl alkylation conditions, and consistently have reactivities at least 50 to 100% higher than the allyl alkylation catalysts known in the art. Representative catalysts thus prepared have produced from 1500–2000 kilograms of propene dimer per kilogram of potassium used to prepare the catalyst up to the termination of the experimental run for reasons other than catalyst deactivation.

(B) In a second allyl alkylation catalyst preparation, 232 grams of crystalline metamorphic magnesium, calcium, and aluminum silicate were ball-milled in the presence of 1,318 grams of refined white oil until microscopic inspections of samples indicated the particle sizing was in the 1–10 micron range. The mixture was then transferred to a 5 liter stainless steel flask equipped with a high speed stirrer and the mixture diluted to 3.3 liters by the addition of white oil. Under an atmosphere of nitrogen the mixture was heated to 120° C. for one half-hour, at which time while stirring at high speeds 225 grams of potassium were added in three increments with about 5 minute intervals between the additions and with a 30 minute continuation after the last addition. One-half liter of white oil containing 4.6 grams of oleic acid was then added in two increments into the slurry and the mixture was stirred for an additional 30 minutes. The particles were found to be in the 2–15 micron size range. A further addition of 5.3 grams of oleic acid in .25 liter of oil were made, and the maximum particle size found was 7 microns. A 200 gram aliquot of the slurry was transferred to a 500 cc. three-necked flask fitted with a stirrer, and the flask and contents were heated to 210° C. under an atmosphere of nitrogen. The nitrogen atmosphere was replaced with hydrogen and the system was held at 210–220° C. for 35 minutes. The catalyst thus prepared was cooled to 130° C. under an atmosphere of hydrogen, and then to room temperature under an atmosphere of nitrogen. The maximum particle size was 3 microns. Titration of the aliquot was 2-methoxy ethanol indicated 146% of the theoretical hydrogen expected for potassium, showing the presence of potassium hydride. This catalyst when tested in use, for example, to catalyze the dimerization of propene at 150° C. and a pressure of 1200 p.s.i.g. required no induction period and had an exceptional catalytic activity. Inspections of the used catalyst indicated the particle size to be less than 6 microns in size. When the hydride allyl alkylation catalyst was prepared in an analogous manner, except that the oxy-compound and polar organic compound were omitted, inspection indicated that the particle size was in the 3–6 micron range, and while this material showed an initial high activity, there was a rapid decline after a very short use. This material was found to have agglomerated into a dark tacky solid which was inactive.

EXAMPLE 8

Further examples demonstrating that the catalysts of the present invention are effective in general for olefinic hydrocarbon alkylations are shown by the following:

(A) In the manner described in Example 7A, sodium, commercial talc (1–10 microns), oleic acid and white oil in the proportions, respectively, 1 gram atom, 8.3 cc. (24 grams), $3.2 \times 10^{-3}$ mols and 0.2 liters were converted to a catalyst complex at 120° C. A portion of the catalyst, 58 g. or 65 cc. was diluted by adding 35 cc. of oil and charged along with 66 g. of propene and 36 g. of ethene to a shaking autoclave. After about 90 minutes at 150° C. and 1290 p.s.i.g. reaction commenced, as indicated by the pressure drop. At a final pressure of 680 p.s.i.g. the reaction was stopped and 50 cc. of a product recovered having the composition:

| | Percent |
|---|---|
| 1-pentene | 6 |
| 2-pentene | 66 |
| Methyl-pentenes | 3 |
| Heptenes | 16 |
| Other | 9 |

(B) A portion of the catalyst in (A) containing 4 g. of sodium was charged into the autoclave together with 150 cc. of toluene and 35 g. of ethene. The autoclave and contents were maintained at 150° C. for 10 hours. The recovered product boiling above toluene (53 cc.) was as follows:

| | Percent |
|---|---|
| $C_9$ aromatic hydrocarbon (assumed n-propylbenzene) | 81 |
| $C_{11}$ aromatic hydrocarbon (assumed 3-phenylpentane) | 18 |
| Other | 1 |

On the contrary, attempts to effectively dimerize propene using sodium metal placed upon finely divided ($\mu$100 microns plus) inert materials in an inert hydrocarbon slurry and in the absence of polar organic compounds were unsuccessful. This is shown in Table VI:

*Table VI.—Reactions of propylene with supported sodium catalyst*

RUN CONDITIONS

| Support | Wt. Percent Na Added | Temp., ° C. | Time, hr. | Results |
|---|---|---|---|---|
| Powdered $Na_2CO_3$ | 10 | 232 | 16 | Negligible reaction. |
| Quartz Sand | 3.2% K 0.8% Na | 150 | 24 | Slow reaction, tarry products. |
| Kappa alumina | 4.9 | 150 | 8 | Trace of product. |
| Celite + anthracene | 36 | 150 | 18 | No reaction. |
| Fused alumina | 5.4 | 150 | 24 | Do. |
| Kappa alumina | 9 | 150 | 15 | Trace of product. |
| Celite 408 | 20 | 204 | 17 | No reaction. |
| Alpha alumina | 13 | 204 | 7 | Do. |

The above batch tests indicated sodium metal containing allyl alkylation catalysts prepared in the manner of the present invention to be substantially improved in performance over prior art catalysts. In an analogous manner sodium metal-containing catalysts were prepared using calcium carbonate and oleic acid, and comparable results as in (A) where obtained. Other olefin reaction pairs employed were: (a) ethene and 1-butene, and (b) ethene and isobutene. As in the case of the potassium metal-containing catalysts, coke and tar production problems appeared to be eliminated.

EXAMPLE 9

A potassium metal allyl alkylation catalyst was prepared as in Example 7(A), using metamorphic talc and oleic acid. A 35 cc. aliquot (contained 2 grams of potassium) was diluted to 100 cc. with white oil and charged to a small autoclave with 63 g. of isobutene and 72 g. of ethene, and the autoclave and contents were heated. Reaction commenced when the temperature reached 112° C. and was complete after 12 minutes of reaction time. The product as shown by gas-liquid chromatographic analysis had the composition:

| | Percent |
|---|---|
| 2-methyl-1-pentene | 31 |
| 2-methyl-2-pentene | 11 |
| $C_8$ olefin | 43 |
| $C_{10}$ olefin | 12 |
| Other | 3 |

In a similar manner, 74 g. of propene and 47 g. of ethene were contacted in the presence of a second portion of the potassium metal-containing catalyst at 115° C. The product recovered amounted to 75 cc. of a mixture as follows:

| | Percent |
|---|---|
| 1-pentene | 70 |
| 2-pentene | 26 |
| x-Methylene-pentenes | 4 |

In the foregoing examples, the reaction products and the autoclaves were free of carbonaceous deposits, and the used catalysts were highly active and capable of effective continued use in a continuous reactor. The unusually low reaction initiator temperatures are also indicative of the quality of the allyl alkylation catalysts prepared by the present process.

EXAMPLE 10

An allyl alkylation catalyst was prepared as in Example 7(A) except that sodium metasilicate was used as the oxy-compound instead of talc. About 8 grams of the catalyst complex in 100 cc. of white oil and 133 grams of propene were charged to a 630 cc. shaking autoclave. After a short period at 150° C. reaction commenced and was continued for a period of 4.3 hours, during which the pressure dropped from 1260 to 600 p.s.i.g. The reaction was discontinued by cooling and the product recovered. The used catalyst was inspected microscopically and found to be in the 1–15 micron particle range. The product was:

| | Percent |
|---|---|
| 4-methyl-1-pentene | 79 |
| 4-methyl-2-pentene | 10 |
| n-Hexenes | 9 |
| Other | 2 |

EXAMPLE 11

1-butene and ethene were contacted with the alkylation catalyst prepared as in Example 7A using potassium, talc, and oleic acid in the proportions respectively: 1 gram atom, 13.4 cc. (39 grams), $5.5 \times 10^{-3}$ mols, in a 3.8 liter stirred autoclave containing 36 grams of the catalyst (18 grams of K), about 1000 grams of paraffinic white oil, 560 grams of 1-butene, and 240 grams of ethene. Commencement of the reaction was noted when the heated mixture reached about 70° C. After a 20 minute reaction time the reaction was essentially complete. The final temperature was 138° C. and the pressure varied from 44 to 28 atmospheres. The product compositon was:

| | Percent |
|---|---|
| 3-methyl-1-pentene | 82 |
| 3-methyl-2-pentene | 3 |
| x-n-Hexenes | 5 |
| $C_8$-alkenes | 10 |

EXAMPLE 12

The preceding example was repeated except that the temperature was maintained at 83° C. Under these conditions the reaction time was 150 minutes and the 3-methyl-1-pentene fraction was 85.3%.

As indicated in Examples 11 and 12, the catalysts of the present invention are especially effective for the production of 3-methyl-1-pentene. When the reaction is employed in a continuous process, and preferably at about 10–80% conversion per pass, the product may be as high as 90% 3-methyl-1-pentene, with reaction temperatures being in the range 80–200° C. and higher, pressures in the range 10 to 200 atmospheres, and liquid hourly space velocities in the range 0.2 to 200.

EXAMPLE 13

When higher molecular weight 1-alkenes are contacted with ethene in the presence of the catalyst complex, for instance as in Examples 11 and 12, alkylation occurs readily except that somewhat higher temperatures are desirably used. Thus at about 150° C. the reaction proceds readily, and about 10 grams of ethene per gram of potassium used in the preparation of the catalyst per hour are consumed when decene-1 is used. The product composition may vary depending upon feed composition but is approximately as follows:

| | Mol percent |
|---|---|
| Decene | 9.3 |
| Dodecene | 76.8 |
| $C_{14}H_{28}$ | 10.3 |

The alkylation catalyst is therefore useful for the upgrading of 1-alkenes, and particularly of nondetergent range olefins to higher molecular weight olefins having molecular weights necessary for the production of detergents. 1-alkenes having from 3 to 20 carbon atoms per molecule may be converted to olefins having molecular weight increase by 1, 2, and even 3 ethylene unit additions.

EXAMPLE 14

In an 0.6 liter-shaking autoclave 129 grams of an alkylbenzene obtained by the HF alkylation of benzene with a thermally cracked wax olefin was contacted with ethene and a potassium containing allyl alkylation catalyst prepared as in Example 7(A), using talc and oleic acid under the following conditions:

| | |
|---|---|
| Pressure, atmospheres | 62 to 35 |
| Temperature, ° C. | 150 |
| Time, hours | 1.7 |

The reaction was discontinued after about 0.5 mol of ethene per mol of alkylbenzene feed had been utilized. Product examination indicated that the catalyst complexes of the present invention are especially useful for the upgrading of alkylbenzenes having at least one α-hydrogen ($\phi CHR_1R_2$), whereby the molecular weight of the alkyl group on an alkylbenzene is increased by at least one ethylene group. Thus, alkylbenzenes prepared from low molecular weight olefin fractions which normally are unsuitable for use in alkylaryl benzene sulfonate detergent production may be readily converted to a useful molecular weight range using the catalyst complexes of the present invention, whereby alkylbenzenes having side chains of from 12–16 carbon atoms may be produced.

EXAMPLE 15

In the general manner described in Example 7(A), an allyl alkylation catalyst was prepared using a mixture of sodium metal and potassium metal in the weight ratio, respectively, of 24 to 1. 6.25 grams of the alloy, 75 cc. of the paraffinic hydrocarbon, 0.3 cc. of oleic acid and 6 grams of ball milled talc having particle sizes in the range 0.1 to 10 microns were used in the catalyst preparation.

The prepared catalyst was charged to a 600 cc. oxygen-free, dry bomb, together with 74 grams of butene-1 and 25 grams of ethene. The bomb and contents were heated to 150° C. while shaking during the heat-up period and subsequent reaction period. Upon reaching about 150° C. the reaction of the charge commenced. The maximum pressure was 1045 p.s.i.g., the minimum was 625 p.s.i.g., and the total reaction time was 103 minutes.

The cooled bomb and contents were sparged with nitrogen gas to strip out the $C_2$–$C_6$ hydrocarbons and the catalyst was inspected. The bomb was completely clean, containing no evidence of tar, coke or free agglomerated alkali metal.

The gross appearance of the catalyst was excellent, being a light tan colored slurry. Microscopic examination revealed the catalyst to be 3–15 microns in particle size.

This experiment indicated that mixtures of alkali metals as well as the individual alkali metals are useful for the preparation of the stabilized allyl alkylation catalyst complexes of the present invention.

I claim:
1. A process for the production of a superfinely divided allyl alkylation catalyst which comprises contacting in a normally aprotic liquid hydrocarbon medium under dispersing conditions at a temperature below about 230° C. in the proportions:
    (1) 1 gram atom of molten alkali metal having an atomic number greater than 3 and less than 56;
    (2) from about 7 to 45 cc. of an inorganic solid non-acidic oxy-compound substantially unreactive to alkali metals and aprotic hydrocarbons at temperatures below 230° C. having a particle sizing in the range from about 0.1 to 10 microns;
    (3) from about $7 \times 10^{-4}$ to $1 \times 10^{-1}$ mols of an organic compound having a pKa in the range from about 1–28, having a dipole moment of from about 1.0 to 5.0 Debye units ($\mu \times 10^{18}$ e.s.u.) and having from 1 to 3 oleophylic groups of from 1–20 carbon atoms per group;
    (4) from about 0.3 to 7.5 liters of normally aprotic hydrocarbon.

2. In the allyl alkylation of hydrocarbons under alkali metal catalyzed allyl alkylation conditions, the improvement which comprises the employment of an allyl alkylation catalyst prepared by contacting in a normally aprotic liquid hydrocarbon medium under dispersing conditions at a temperature below about 230° C. in the proportions:
    (1) 1 gram atom of molten alkali metal having an atomic number greater than 3 and less than 56;
    (2) from about 7 to 45 cc. of an inorganic solid non-acidic oxy-compound substantially unreactive to alkali metals and aprotic hydrocarbons at temperatures below 230° C. having a particle sizing in the range from about 0.1 to 10 microns;
    (3) from about $7 \times 10^{-4}$ to $1 \times 10^{-1}$ mols of an organic compound having a pKa in the range from about 1 to 28, having a dipole moment of from about 1.0 to 5.0 Debye units ($\mu \times 10^{18}$ e.s.u.) and having from 1 to 3 oleophylic groups of from 1–20 carbon atoms per group;
    (4) from about 0.3 to 7.5 liters of normally aprotic hydrocarbon; and
wherein said oxy-compound contains at least 1 cation of the elements having a relative electronegativity below about 1.6 and the negative radical is selected from the group consisting of silicate, sulfate, and carbonate, and wherein said polar organic compound is of the general formula:

$$RX$$

wherein R is an inert oleophylic group of the general formula:

$$(C_aH_b)$$

wherein $a$ may be 1 to 19 and $b$ may be 3 to 39, and X is a polar group exhibiting a pKa in the range from about 1 to 28, and a dipole moment in the range from about 1.5 to 5.0 Debye units.

3. The process of claim 2 wherein said allyl alkylation of hydrocarbons is the dimerization of propene.

4. The allyl alklylation catalyst complex composition as obtained by contacting in a normally aprotic liquid hydrocarbon medium under dispersing conditions at a temperature below about 230° C. in the proportions:
  (1) 1 gram atom of molten alkali metal having an atomic number greater than 3 and less than 56;
  (2) from about 7 to 45 cc. of an inorganic solid nonacidic oxy-compound substantially unreactive to alkali metals and aprotic hydrocarbons at temperatures below 230° C. having a particle sizing in the range from about 0.1 to 10 microns;
  (3) from about $7 \times 10^{-4}$ to $1 \times 10^{-1}$ mols of an organic compound having a pKa in the range from about 1 to 28, having a dipole moment of from about 1.0 to 5.0 Debye units ($\mu \times 10^{18}$ e.s.u.) and having from 1 to 3 oleophylic groups of from 1 to 20 carbon atoms per group;
  (4) from about 0.3 to 7.5 liters of normally aprotic hydrocarbon; and
wherein said oxy-compound contains at least 1 cation of the elements having a relative electronegativity below about 1.6 and the negative radical is selected from the group consisting of silicate, sulfate, and carbonate, and wherein said polar organic compound is of the general formula:

$$RX$$

wherein R is an inert oleophylic group of the general formula:

$$(C_aH_b)$$

wherein $a$ may be 1 to 19 and $b$ may be 3 to 39, and X is a polar group exhibiting a pKa in the range from about 1 to 28, and a dipole moment in the range from about 1.5 to 5.0 Debye units.

5. The catalyst composition of claim 4 wherein X is selected from the group consisting of:

—$SO_3H$, —$CO_2H$, —$PO_2H$, —$SO_2H$, —$PO_3H_2$, —OH
—SH, —$CH_2NO_2$, —$CH_2C$=N, —$CH_2$—CHO,
=$CH_2CO$
—$NH_2$, —$CONH_2$, —$SO_2NH_2$, —$PO_2NH_2$

6. The composition of claim 4 wherein said polar compound is a strong acid having a pKa in the range from about 1 to 8.

7. The composition of claim 4 wherein said polar compound is a weak acid having a pKa in the range from about 9 to 20.

8. The composition of claim 4 wherein said alkali metal is potassium.

9. The composition of claim 4 wherein at least 2 of said alkali metals are used in combination.

10. The composition of claim 5 wherein at least 2 of said alkali metals are used in combination.

11. In the alkylation of a 1-alkene hydrocarbon with ethylene under alkali metal catalyzed alkylation conditions, the improvement which comprises the employment of an alkylation catalyst prepared by contacting in a normally aprotic liquid hydrocarbon medium under dispersing conditions at a temperature below about 230° C. in the proportions:
  (1) 1 gram atom of molten alkali metal having an atomic number greater than 3 and less than 56;
  (2) from about 7 to 45 cc. of an inorganic solid nonacidic oxy-compound substantially unreactive to alkali metals and aprotic hydrocarbons at temperatures below 230° C. having a particle sizing in the range from about 0.1 to 10 microns;
  (3) from about $7 \times 10^{-4}$ to $1 \times 10^{-1}$ mols of an organic compound having a pKa in the range from about 1 to 28, having a dipole moment of from about 1.0 to 5.0 Debye units ($\mu \times 10^{18}$ e.s.u.) and having from 1 to 3 oleophylic groups of from 1–20 carbon atoms per group;
  (4) from about 0.3 to 7.5 liters of normally aprotic hydrocarbon; and
wherein said oxy-compound contains at least 1 cation of the elements having a relative electronegativity below about 1.6 and the negative radical is selected from the group consisting of silicate, sulfate, and carbonate, and wherein said polar organic compound is of the general formula:

$$RX$$

wherein R is an inert oleophylic group of the general formula:

$$(C_aH_b)$$

wherein $a$ may be 1 to 19 and $b$ may be 3 to 39, and X is a polar group exhibiting a pKa in the range from about 1 to 28, and a dipole moment in the range from about 1.5 to 5.0 Debye units, and wherein said alkene contains from 3 to 20 carbon atoms.

12. In the alkylation of an alkylbenzene hydrocarbon with ethylene under alkali metal catalyzed alkylation conditions, the improvement which comprises the employment of an alkylation catalyst prepared by contacting in a normally aprotic liquid hydrocarbon medium under dispersing conditions at a temperature below about 230° C. in the proportions:
  (1) 1 gram atom of molten alkali metal having an atomic number greater than 3 and less than 56;
  (2) from about 7 to 45 cc. of an inorganic solid nonacidic oxy-compound substantially unreactive to alkali metals and aprotic hydrocarbons at temperatures below 230° C. having a particle sizing in the range from about 0.1 to 10 microns;
  (3) from about $7 \times 10^{-4}$ to $1 \times 10^{-1}$ mols of an organic compound having a pKa in the range from about 1 to 28, having a dipole moment of from about 1.0 to 5.0 Debye units ($\mu \times 10^{18}$ e.s.u.) and having from 1 to 3 oleophylic groups of from 1–20 carbon atoms per group;
  (4) from about 0.3 to 7.5 liters of normally aprotic hydrocarbon; and
wherein said oxy-compound contains at least 1 cation of the elements having a relative electronegativity below about 1.6 and the negative radical is selected from the group consisting of silicate, sulfate, and carbonate, and wherein said polar organic compound is of the general formula:

$$RX$$

and wherein R is an inert oleophylic group of the general formula:

$$(C_aH_b)$$

wherein $a$ may be 1 to 19 and $b$ may be 3 to 39, and X is a polar group exhibiting a pKa in the range from about 1 to 28, and a dipole moment in the range from about 1.5 to 5.0 Debye units, and wherein said benzene has at least one α-hydrogen atom and said alkyl group contains from 1 to 20 carbon atoms.

References Cited by the Examiner

UNITED STATES PATENTS

| | | | |
|---|---|---|---|
| 2,758,096 | 8/1956 | Hill | 252—430 |
| 2,834,818 | 5/1958 | Schmerling et al. | 252—430 |
| 3,053,916 | 9/1962 | Wilson et al. | 252—430 |

DELBERT E. GANTZ, *Primary Examiner.*

ALPHONSO D. SULLIVAN, *Examiner.*

J. E. DEMPSEY, *Assistant Examiner.*